US012239282B2

(12) United States Patent
Scott et al.

(10) Patent No.: US 12,239,282 B2
(45) Date of Patent: Mar. 4, 2025

(54) VACUUM CLEANER WITH LIQUID RETENTION

(71) Applicant: MILWAUKEE ELECTRIC TOOL CORPORATION, Brookfield, WI (US)

(72) Inventors: John S. Scott, Brookfield, WI (US); Scott T. Moeller, Richfield, WI (US); Brian Cornell, West Allis, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/356,934

(22) Filed: Jun. 24, 2021

(65) Prior Publication Data

US 2021/0401249 A1 Dec. 30, 2021

Related U.S. Application Data

(60) Provisional application No. 63/093,371, filed on Oct. 19, 2020, provisional application No. 63/043,395, filed on Jun. 24, 2020.

(51) Int. Cl.
*A47L 9/16* (2006.01)
*A47L 5/24* (2006.01)
(Continued)

(52) U.S. Cl.
CPC ................ *A47L 9/165* (2013.01); *A47L 5/24* (2013.01); *A47L 7/0019* (2013.01);
(Continued)

(58) Field of Classification Search
CPC ...... A47L 9/165; A47L 9/1608; A47L 9/1633; A47L 9/22; A47L 9/322; A47L 9/2884;
(Continued)

(56) References Cited

U.S. PATENT DOCUMENTS 2,276,844 A 3/1942 Holm-Hansen
2,684,125 A * 7/1954 Brace .................. A47L 9/1633 55/319
(Continued)

FOREIGN PATENT DOCUMENTS

CN 102878115 B 5/2016
CN 107898383 A 4/2018
(Continued)

OTHER PUBLICATIONS

PE2E Translation KR2012-0052692; Kim, Min Ha; Cyclone Dust Collecting Apparatus and Vacuum Cleaning Having the Same; May 24, 2012 (Year: 2012).*
(Continued)

*Primary Examiner* — Brian D Keller
*Assistant Examiner* — Sidney D Full
(74) *Attorney, Agent, or Firm* — Michael Best & Friedrich LLP

(57) ABSTRACT

A housing for a handheld vacuum cleaner includes a suction opening, a cyclone chamber, and a helical passage. The suction opening is defined in the housing. The cyclone chamber is in fluid communication with the suction opening. The helical passage includes a first end, a second end, and at least one sidewall. The first end is in fluid communication with the suction opening. The second end is in fluid communication with the cyclone chamber. The at least one sidewall extends between the first end and the second end. The at least one sidewall separates the helical passage from the cyclone chamber.

10 Claims, 16 Drawing Sheets

(51) Int. Cl.

| | |
|---|---|
| ***A47L 7/00*** | (2006.01) |
| ***A47L 9/22*** | (2006.01) |
| ***A47L 9/28*** | (2006.01) |
| ***A47L 9/32*** | (2006.01) |
| ***B04C 3/06*** | (2006.01) |

(52) U.S. Cl.
CPC ........... *A47L 7/0042* (2013.01); *A47L 9/1608* (2013.01); *A47L 9/22* (2013.01); *A47L 9/2884* (2013.01); *A47L 9/322* (2013.01); *B04C 3/06* (2013.01)

(58) Field of Classification Search
CPC . A47L 5/22; A47L 5/24; A47L 7/0004; A47L 7/0019; A47L 7/0042; A47L 9/1683; A47L 9/2842; B04C 3/06
USPC .......................................................... 15/353
See application file for complete search history.

(56) References Cited

U.S. PATENT DOCUMENTS

| | | | | |
|---|---|---|---|---|
| 6,428,589 | B1 | 8/2002 | Bair et al. | |
| 6,829,804 | B2 | 12/2004 | Sepke | |
| D582,114 | S | 12/2008 | Dyson | |
| 7,544,224 | B2 | 6/2009 | Tanner et al. | |
| 7,686,858 | B2 | 3/2010 | Oh | |
| 7,931,722 | B2 | 4/2011 | Sepke et al. | |
| 8,578,555 | B2 | 11/2013 | Conrad | |
| 8,806,707 | B2 * | 8/2014 | Soen | B01D 45/16 55/459.3 |
| 8,813,305 | B2 * | 8/2014 | Conrad | A47L 5/36 55/467 |
| 8,844,093 | B2 * | 9/2014 | Conrad | B29C 65/342 15/353 |
| 9,005,325 | B2 * | 4/2015 | Smith | A47L 5/24 55/424 |
| 9,027,198 | B2 | 5/2015 | Conrad | |
| 9,066,643 | B2 | 6/2015 | Conrad | |
| 9,084,522 | B2 | 7/2015 | Conrad | |
| 9,084,524 | B2 | 7/2015 | Conrad | |
| 9,095,245 | B2 | 8/2015 | Conrad | |
| 9,119,514 | B2 | 9/2015 | Conrad | |
| 9,265,395 | B2 | 2/2016 | Conrad | |
| 9,320,401 | B2 | 4/2016 | Conrad | |
| 9,433,332 | B2 | 9/2016 | Conrad | |
| 9,591,958 | B2 | 3/2017 | Conrad | |
| D813,475 | S | 3/2018 | Lee et al. | |
| 9,980,616 | B2 | 5/2018 | Brown et al. | |
| 10,080,472 | B2 | 9/2018 | Conrad | |
| 10,264,934 | B2 | 4/2019 | Conrad | |
| 10,376,112 | B2 | 8/2019 | Conrad | |
| 10,405,710 | B2 | 9/2019 | Conrad et al. | |
| 2002/0189048 | A1 * | 12/2002 | Maruyama | A47L 9/165 15/344 |
| 2007/0266678 | A1 * | 11/2007 | Makarov | B04C 5/13 55/337 |
| 2008/0172992 | A1 | 7/2008 | Conrad | |
| 2008/0196196 | A1 * | 8/2008 | Conrad | A47L 5/36 15/300.1 |
| 2009/0235482 | A1 | 9/2009 | Tanner et al. | |
| 2009/0265883 | A1 * | 10/2009 | Reed, Jr. | A47L 9/1608 15/353 |
| 2011/0185535 | A1 * | 8/2011 | Ivarsson | A47L 9/1625 15/353 |
| 2016/0120382 | A1 | 5/2016 | Conrad | |
| 2019/0133389 | A1 | 5/2019 | Nam et al. | |
| 2019/0133390 | A1 | 5/2019 | Nam et al. | |
| 2019/0254491 | A1 | 8/2019 | Conrad | |
| 2019/0254492 | A1 | 8/2019 | Conrad | |
| 2019/0307301 | A1 | 10/2019 | Conrad | |
| 2020/0037838 | A1 * | 2/2020 | Paulla | A47L 9/1625 |
| 2020/0163512 | A1 | 5/2020 | Nam et al. | |

FOREIGN PATENT DOCUMENTS

| | | | | |
|---|---|---|---|---|
| EP | 2255710 | A1 | 12/2010 | |
| EP | 3338611 | A1 | 6/2018 | |
| FR | 2940902 | A1 * | 7/2010 | A47L 9/165 |
| JP | 2004351234 | A | 12/2004 | |
| KR | 20120052692 | A * | 5/2012 | A47L 9/16 |
| KR | 1020120052692 | A | 5/2012 | |
| WO | 2019231131 | A1 | 12/2019 | |
| WO | WO-2020014782 | A1 * | 1/2020 | A47L 5/16 |

OTHER PUBLICATIONS

FR-2940902 PE2E Translation; Soen, Alain; Cyclonic Separation Device with Acceleration Ramp; Jul. 16, 2010 (Year: 2010).*
PE2E Translation WO-2020014782; Surface Cleaning Apparatus; Conrad, Wayne; Jan. 23, 2020 (Year: 2020).*
International Search Report and Written Opinion for Application No. PCT/US2021/038853 dated Oct. 19, 2021 (15 pages).
Extended European Search Report for Application No. 21828394.3 dated Jun. 25, 2024 (5 pages).

* cited by examiner

VACUUM CLEANER WITH LIQUID RETENTION

CROSS-REFERENCE TO RELATED APPLICATIONS

This application claims priority to U.S. Provisional Patent Application No. 63/043,395, filed Jun. 24, 2020, and U.S. Provisional Patent Application No. 63/093,371, filed Oct. 19, 2020, the entire contents of each of which are incorporated by reference herein.

FIELD

The present disclosure relates to vacuum cleaners. More particularly, the present disclosure relates to handheld vacuum cleaners.

SUMMARY

A housing for a handheld vacuum cleaner includes a suction opening, a cyclone chamber, and a helical passage. The suction opening is defined in the housing. The cyclone chamber is in fluid communication with the suction opening. The helical passage includes a first end, a second end, and at least one sidewall. The first end is in fluid communication with the suction opening. The second end is in fluid communication with the cyclone chamber. The at least one sidewall extends between the first end and the second end. The at least one sidewall separates the helical passage from the cyclone chamber.

A housing for a handheld vacuum cleaner includes a suction opening, a dirt cup, and a rigid arcuate passage. The suction opening is defined in the housing. The dirt cup includes a cyclone chamber defined therein. The rigid arcuate passage fluidly communicates the suction opening with the cyclone chamber. The rigid arcuate passage is discrete from the cyclone chamber along a majority of a length of the rigid arcuate passage. The rigid arcuate passage is open to the cyclone chamber at an end of the rigid arcuate passage.

A handheld vacuum cleaner includes a dirt cup, a handle, an inlet portion, and a rigid passage. The dirt cup includes a cyclone chamber defined therein. The handle is coupled to the dirt cup, with a plane bisecting the handle and the cyclone chamber. The inlet portion includes a suction opening in fluid communication with the cyclone chamber. The rigid passage fluidly communicates the suction opening with the cyclone chamber. The rigid passage includes a first end, a second end, and a sidewall. The first end of the rigid passage is in fluid communication with the suction opening. The second end is downstream from the first end. The second end is in fluid communication with the cyclone chamber. The sidewall separates the rigid passage from the cyclone chamber between the first end and the second end. A majority of the rigid passage is disposed on one side of the plane.

Features and aspects of the disclosure will become apparent by consideration of the following detailed description and accompanying drawings.

DETAILED DESCRIPTION

Figure 1:
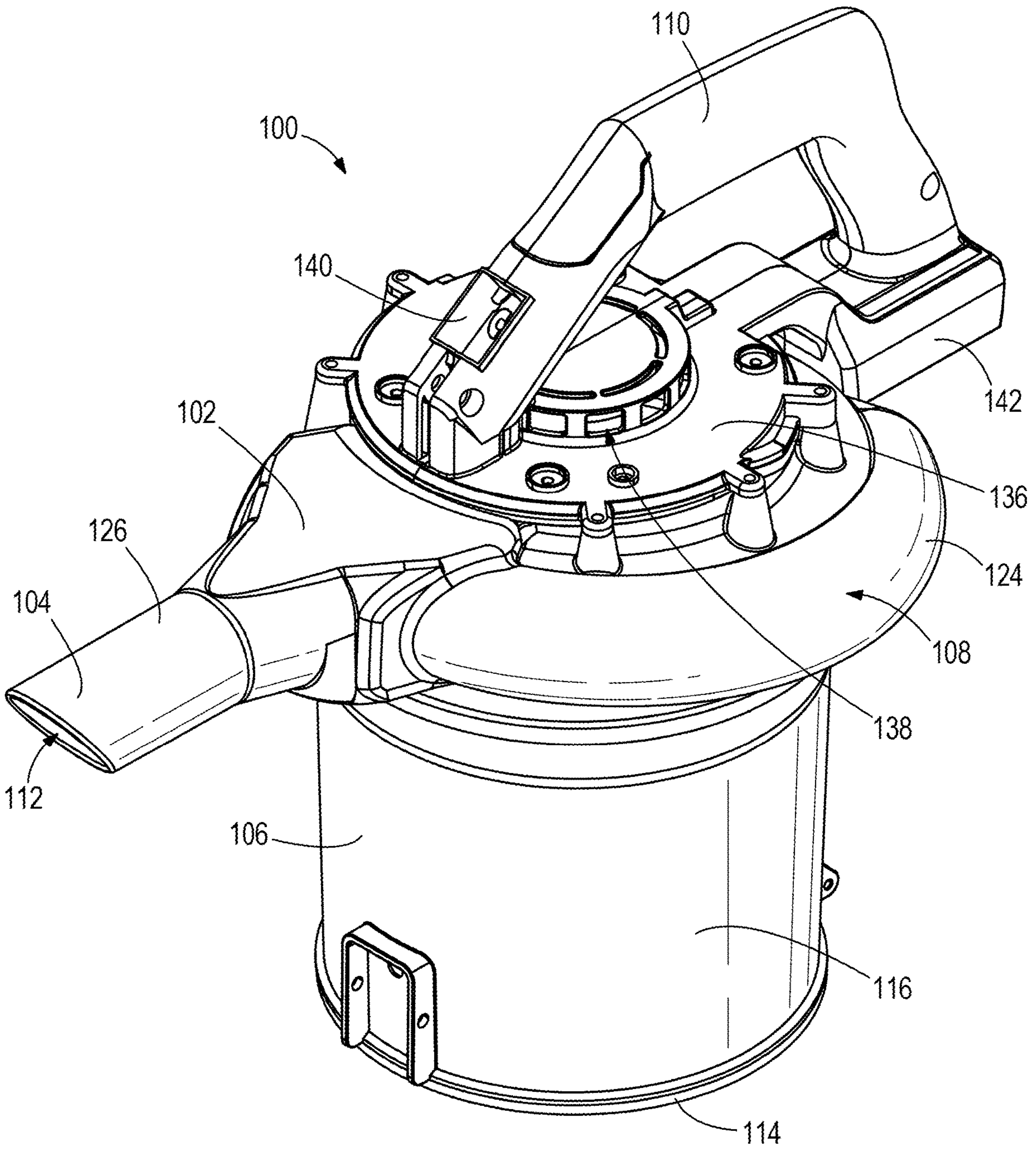
FIG. 1 is a perspective view of a handheld vacuum cleaner, according to embodiments disclosed herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

With reference to FIG. 1, an embodiment of a handheld vacuum cleaner 100 is shown. The vacuum cleaner 100 includes a housing 102, an inlet portion 104, a dirt cup 106, a passage 108 extending between the inlet portion 104 and the dirt cup 106, and a handle 110. In some embodiments, the housing 102 itself includes the inlet portion 104, the dirt cup 106, and the passage 108. The vacuum cleaner 100 also includes a suction source (FIGS. 16 and 17), for example, a suction motor 150 that rotates a fan or impeller 152 to generate a suction airflow.

The inlet portion 104 may be integrally formed with the housing 102 as a single component or may be separately formed from the housing 102. In the illustrated embodiment, the inlet portion 104 is a protrusion of the housing 102. The inlet portion 104 includes a suction opening 112 defined therein for receiving liquid, dirt, and other debris drawn up from a surface being cleaned via the inlet portion 104 alone or via a wand or hose (not shown) attached to the inlet portion 104. The inlet portion 104 may be a male component configured to be inserted in a female portion of a corresponding wand or hose (not shown), or the inlet portion 104 may be a female component configured to receive a male portion of a corresponding wand or hose (not shown).

Figure 10:
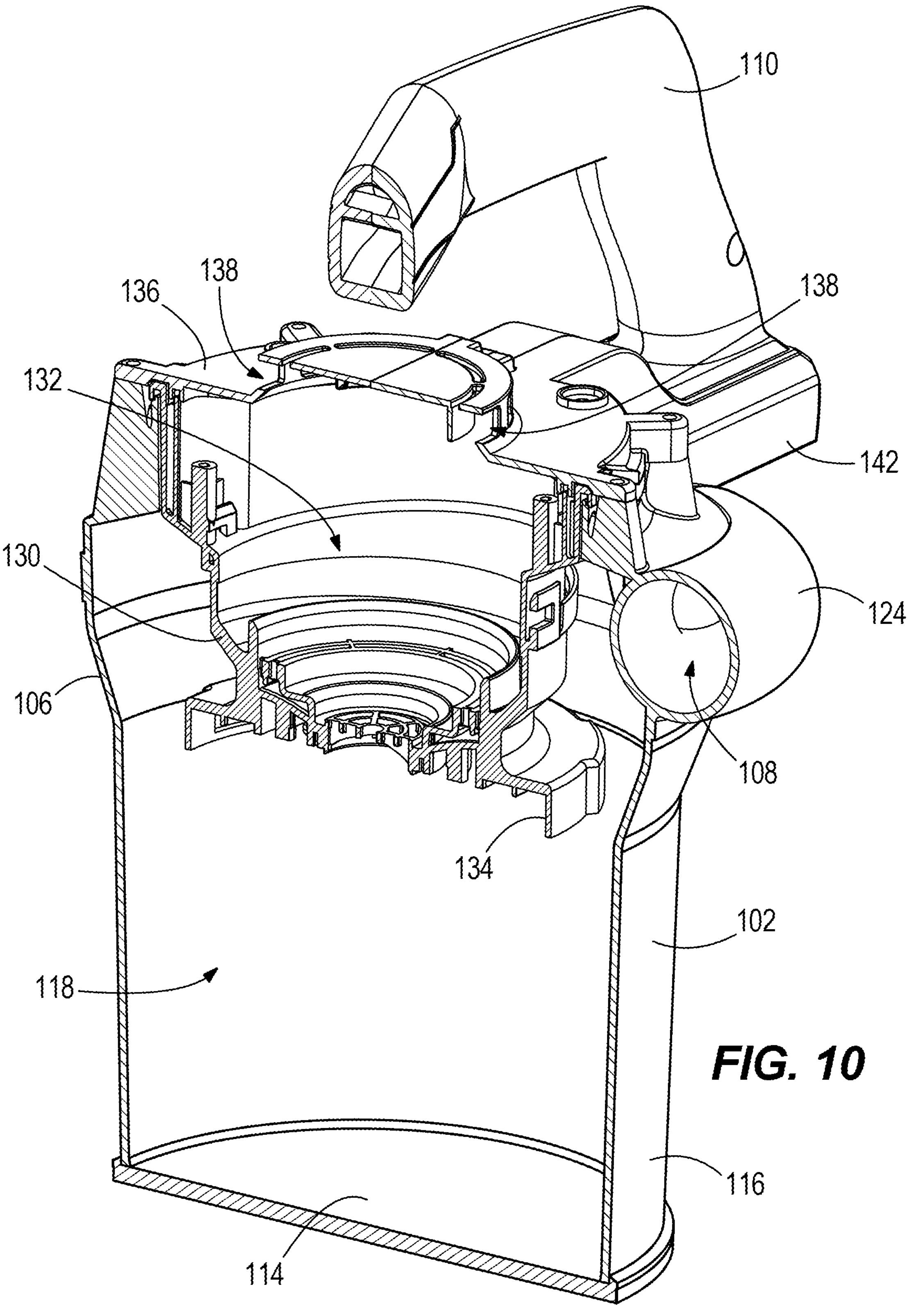
FIG. 10 is a cross-sectional front perspective view of the handheld vacuum cleaner of FIG. 1.

The illustrated embodiment further includes a dirt cup 106 as a part of the housing 102. The dirt cup 106 is shown as being generally cylindrical in shape, but other shapes are also contemplated herein. Some embodiments may include the dirt cup 106 having a bottom door 114 pivotably coupled to the dirt cup wall 116 to allow a user to quickly and easily empty the contents of the dirt cup 106 into, for instance, a garbage can. The pivotable bottom door 114 may be secured with a latch that is diametrically opposite the one or more hinge components. In some embodiments, however, the bottom of the dirt cup 106 may be integrally formed with the remainder of the dirt cup 106, such that the lid section 136 must be removed to access the cyclone chamber 118 for emptying the dirt cup 106. As shown in FIG. 10, the dirt cup 106 includes a cyclone chamber 118 defined therein. The cyclone chamber 118 is in fluid communication with the suction opening 112 via the passage 108, as described in more detail below. The cyclone chamber 118 is also in fluid communication with the suction source (FIGS. 16 and 17) of the vacuum cleaner 100 and receives debris that has been picked up by the vacuum cleaner 100, as described below.

Figure 13:
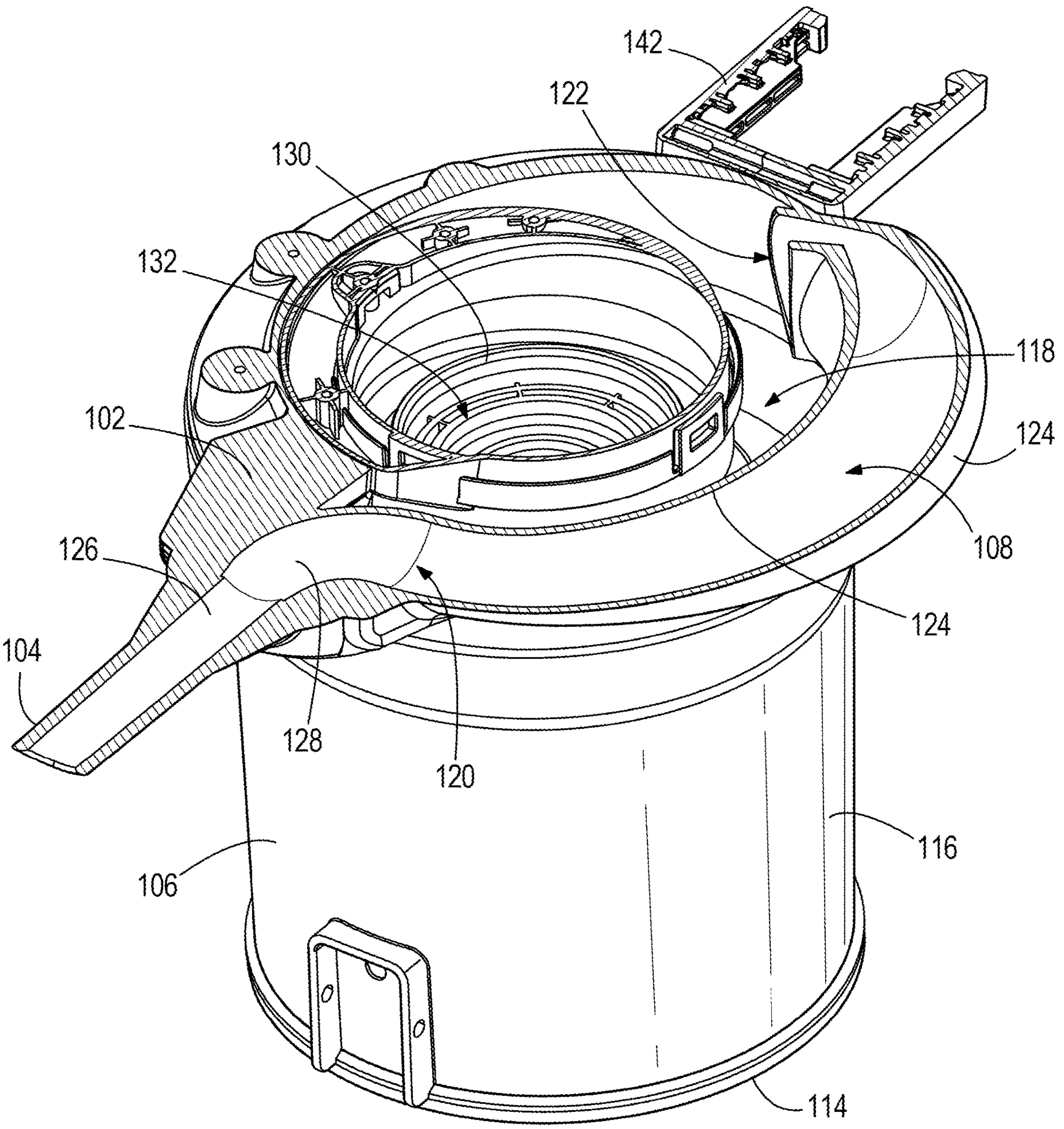
FIG. 13 is a cross-sectional front perspective view of the handheld vacuum cleaner of FIG. 1, the cross section being taken along the same plane as in FIG. 12.
Figure 14:
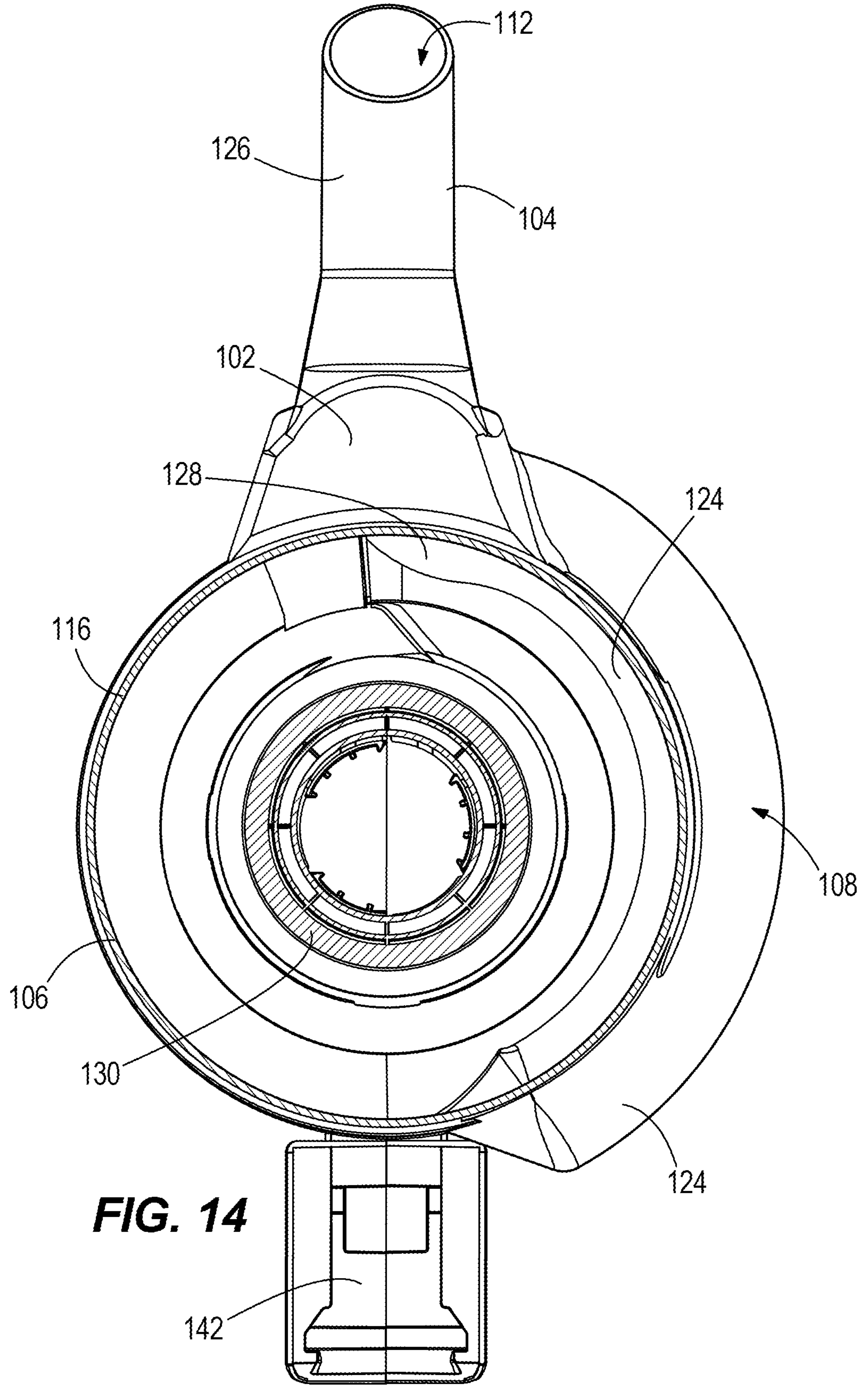
FIG. 14 is a cross-sectional bottom plan view of the handheld vacuum cleaner of FIG. 1.
Figure 15:
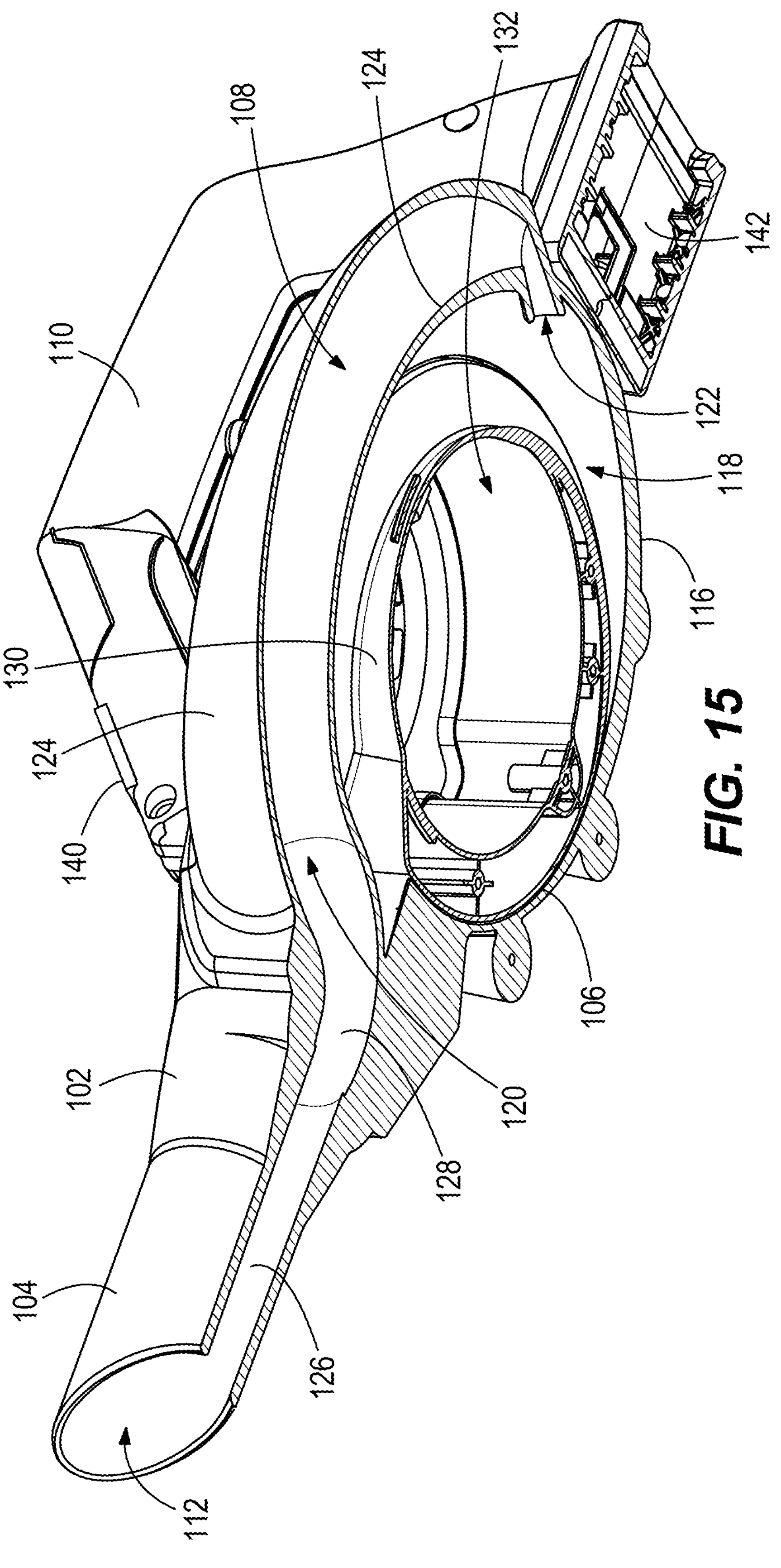
FIG. 15 is a cross-sectional bottom perspective view of the handheld vacuum cleaner of FIG. 1.

Turning now to FIG. 13, the passage 108 fluidly communicates the suction opening 112 of the inlet portion 104 with the cyclone chamber 118 of the dirt cup 106. Accordingly, the suction source (FIGS. 16 and 17) may be operable to draw dirt, liquid and other debris through the inlet portion 104 and into the dirt cup 106 via the passage 108. The passage 108 may be integrally formed with the housing 102 as a single component or may be separately formed from the housing 102. In the illustrated embodiment, the passage 108 is a rigid conduit integrally formed with and protruding or bulging from the housing 102. The passage 108 is arcuate, following along a portion of the outer circumference of the cylindrical dirt cup 106. Other embodiments, however, may include the passage 108 having a different route that may or may not be arcuate or positioned within the perimeter of the housing 102. The passage 108 has a first end 120 and a second end 122. The first end 120 is in fluid communication with the suction opening 112 of the inlet portion 104. The second end 122 is downstream from the first end 120, and the second end 122 is in fluid communication with the cyclone chamber 118 of the dirt cup 106. In the illustrated embodiment, the passage 108 is a helical passage, in that the first end 120 is at a different elevation from the second end 122.

As shown in FIG. 10, the passage 108 is separated from the cyclone chamber 118 of the dirt cup 106 by a sidewall 124 of the passage 108. The sidewall 124 extends along at least a portion the length of the passage 108 between the first end 120 and the second end 122. More specifically, the sidewall 124 prevents direct communication between the suction opening 112 and the cyclone chamber 118, instead forcing the incoming debris and air to travel a relatively circuitous route through the passage 108 prior to being discharged into the cyclone chamber 118. As described in greater detail below, this configuration helps to prevent liquid drawn up by the vacuum cleaner 100 in the dirt cup 106 from accidentally escaping out of the dirt cup 106 via the suction opening 112 when a user tilts the vacuum cleaner 100 forward, for example, during a subsequent vacuuming operation. In the illustrated embodiment, the sidewall 124 of the passage 108 is a portion of the housing 102 and may be integrally formed as a unitary piece with the dirt cup wall 116. The passage 108 is shown as being circular in cross-section, but other cross-sectional shapes are also contemplated herein, such as, for example, triangular, rectangular, elliptical, or the like. As such, the circular cross-section passage 108 is considered to have only one sidewall 124, but other cross-sectional shaped passages may have more than one sidewall. In embodiments including a passage 108 with a triangular cross-section, for example, one of the three sidewalls may face the cyclone chamber 118 and the other two of the three sidewalls may project radially outwardly and may be exposed on the outside of the housing 102.

Returning to FIG. 13, any incoming air, debris, and/or liquid drawn up by the vacuum cleaner enters the suction opening 112 of the inlet portion 104, travels through a straight section 126 of the inlet portion 104, travels through a bend 128, enters the first end 120 of the passage 108, travels through the passage 108, and exits the passage 108 via the second end 122 into the cyclone chamber 118 of the dirt cup 106. In some embodiments, the cross-sectional area of the passage 108 at the second end 122 is smaller than the cross-sectional area of other portions of the passage 108, such as the first end 120. This arrangement may increase the speed of the operational airflow 200 as it enters the cyclone chamber 118.

Figure 11:
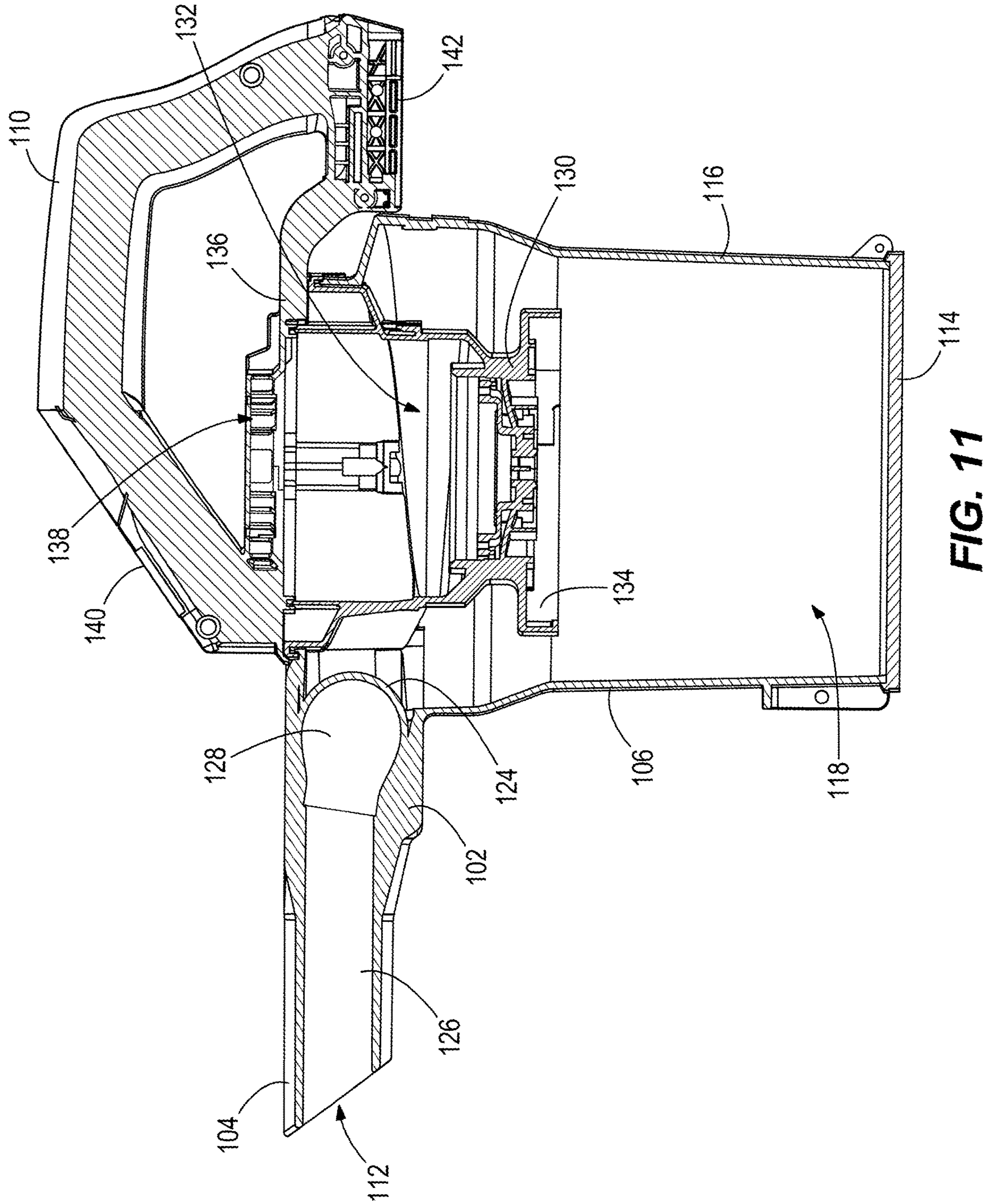
FIG. 11 is a cross-sectional side elevation view of the handheld vacuum cleaner of FIG. 1.

With reference to FIG. 11, heavier liquid and heavier debris (compared to, for example, air) exiting the second end 122 of the passage 108 may at least partially move along a cyclonic route in the cyclone chamber 118 and be forced outwardly by a centrifugal force against the wall 116 of the dirt cup 106, where the liquid and debris may then fall to the bottom of the dirt cup 106, while air and lighter debris (such as fine dust) continue to move along a cyclonic route in the cyclone chamber 118 and then get pulled through a filter 154 (FIG. 17) of conventional design. A suction source housing 130 is coupled to an upper portion of the housing 102 and extends centrally and downwardly into the cyclone chamber 118. As the name suggests, the suction source housing 130 includes a cavity 132 for housing a motor 150 and impeller 152 (FIGS. 16 and 17) that moves the working air through the vacuum. The suction source housing 130 further includes a downwardly facing filter connection portion 134 for receiving the filter. The filter 154 depends from the filter connection portion 134 and further extends downwardly and centrally into the cyclone chamber 118. In some embodiments, the filter 154 removably couples to the filter connection portion 134 with a twist-and-lock connection.

Figure 8:
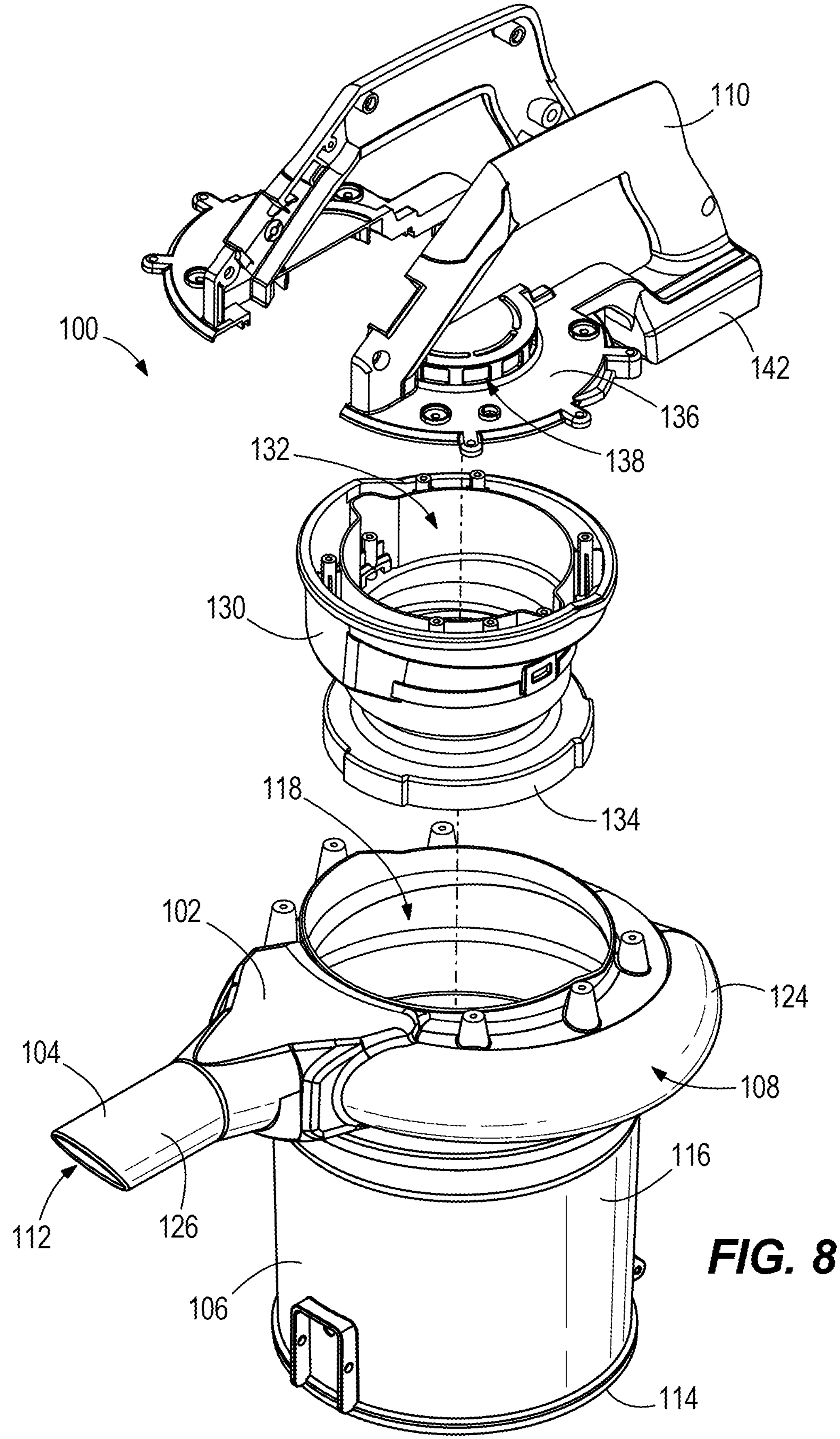
FIG. 8 is an exploded perspective view of the handheld vacuum cleaner of FIG. 1.
Figure 9:
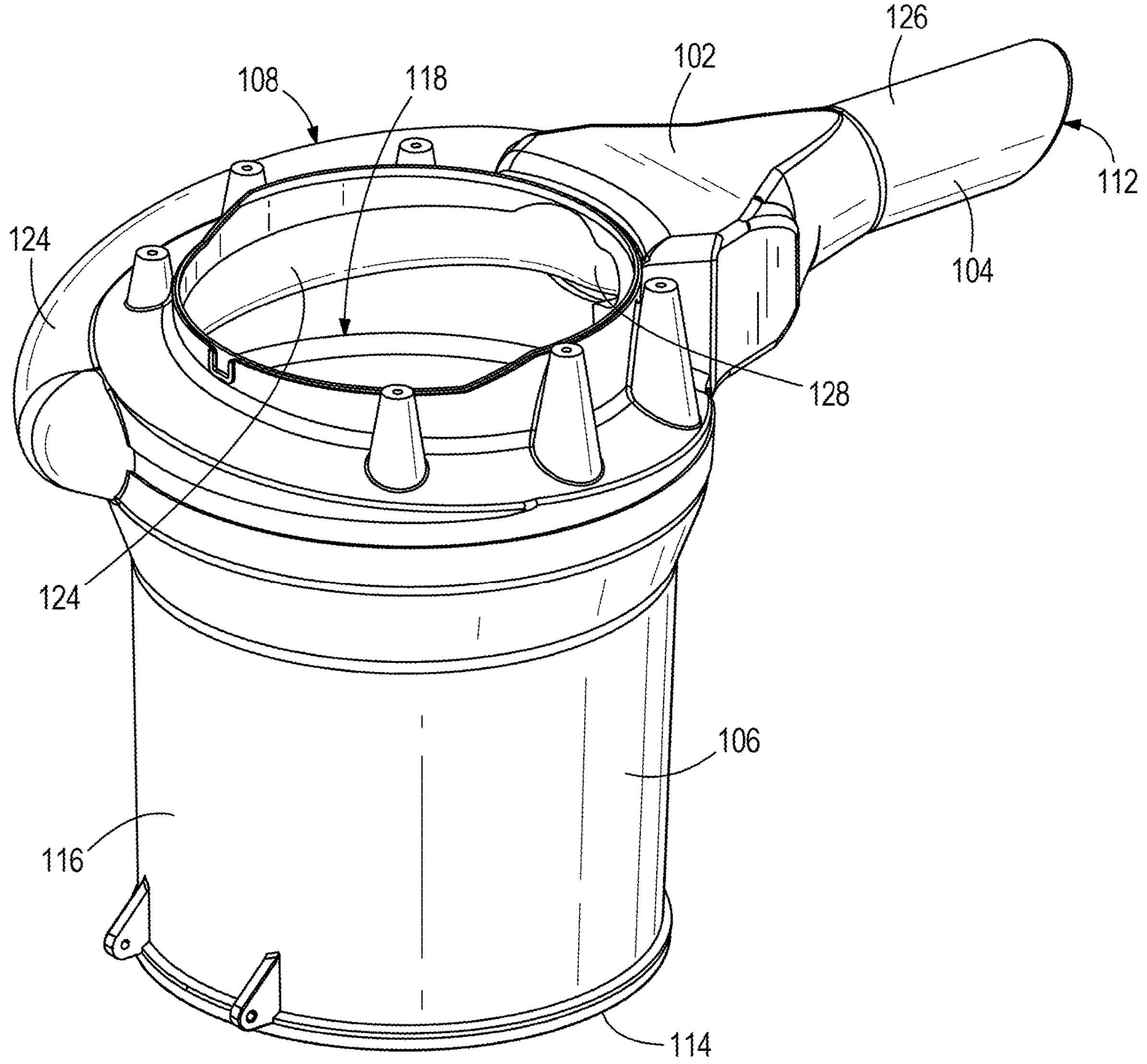
FIG. 9 is a rear perspective view of the handheld vacuum cleaner with the handle and suction source housing removed.

With reference to FIGS. 8 and 11, the vacuum cleaner 100 further includes a lid section 136. In the illustrated embodiment, the lid section 136 is removably coupled to the housing 102 with a plurality of fasteners. The lid section 136 may be removed to replace the filter, access the motor 150 for cleaning or repair, or the like. The lid section 136 is shown as a two-part assembly of a clamshell design, but other configurations are also contemplated herein including, but not limited to, a single unitary component.

The lid section 136 includes one or more exhaust vents 138 defined therein. The exhaust vents 138 allow the working air to leave the vacuum cleaner 100 after having traveled through the suction opening 112, the passage 108, the cyclone chamber 118, and the impeller 152. The lid section 136 further includes a handle 110 that is indirectly coupled to the housing 102. In some embodiments, however, the handle 110 is coupled directly to, for instance, the dirt cup wall 116. In the illustrated embodiment, the handle 110 includes one or more controls 140 disposed thereon. The lid section 136 also includes a battery connection rail 142 coupled to an end of the handle 110, although some embodiments may include the battery connection rail 142 coupled to, for instance, the dirt cup wall 116. In the illustrated embodiment, the battery connection rail 142 removably receives a rechargeable battery pack (not shown). The rechargeable battery pack, in some embodiments, may also be configured to couple to and power other power tools, such as a drill.

Figure 2:
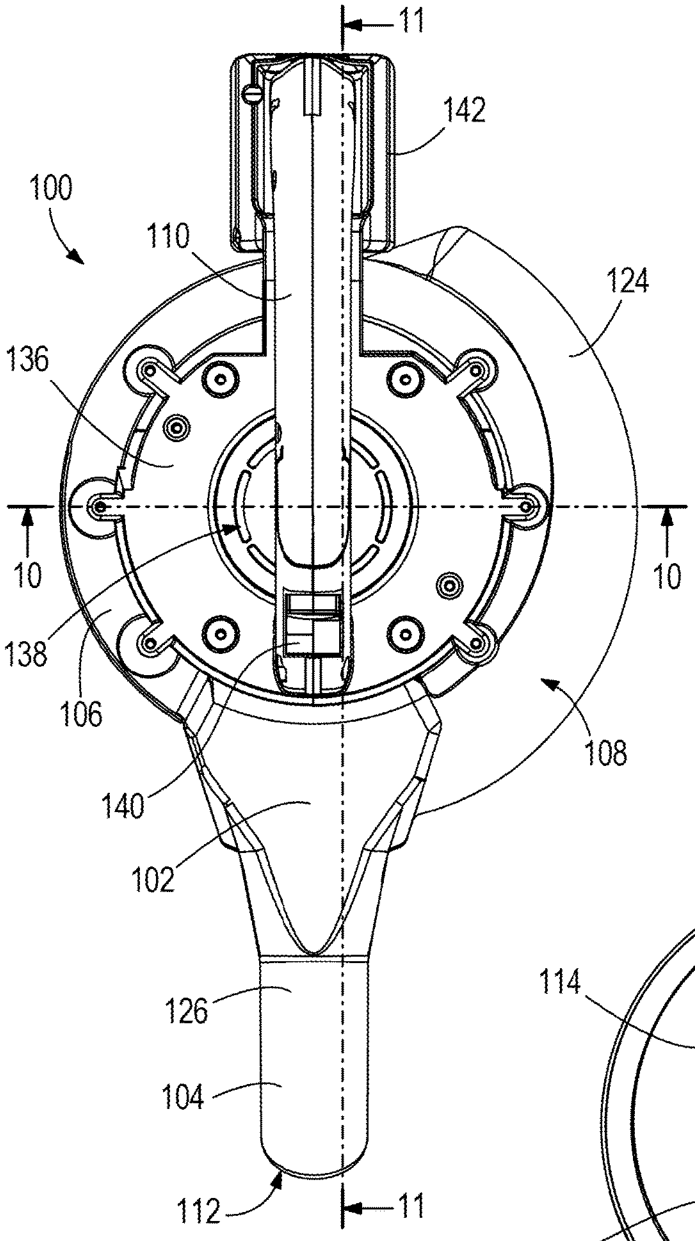
FIG. 2 is a top plan view of the handheld vacuum cleaner of FIG. 1.
Figure 3:
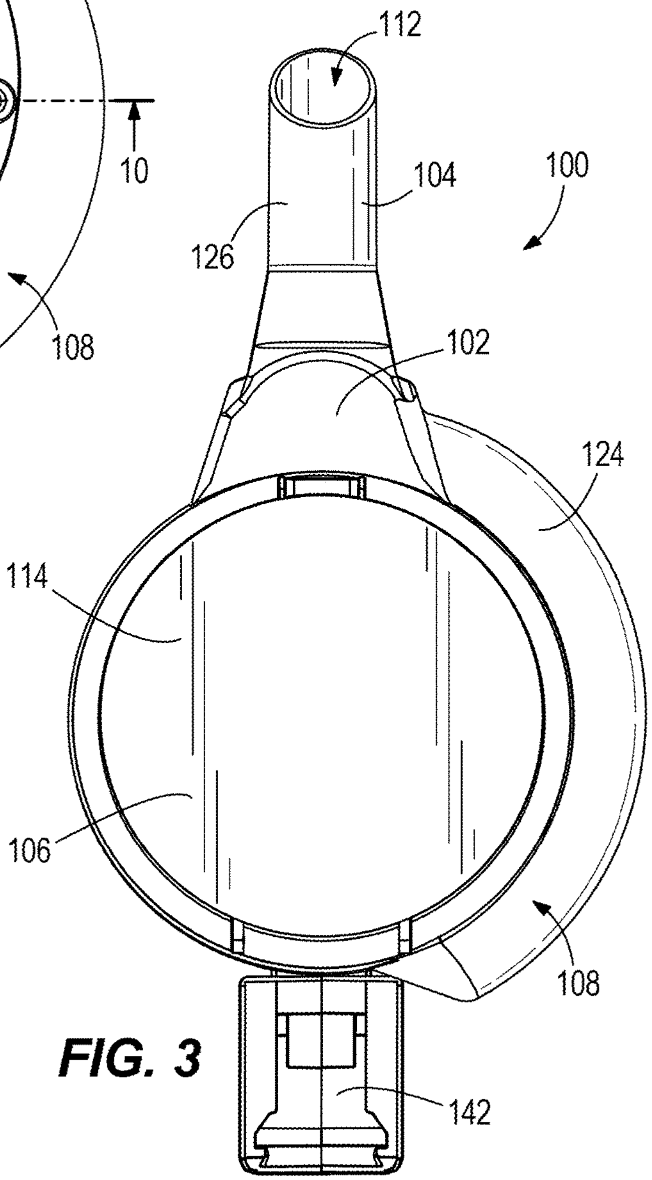
FIG. 3 is a bottom plan view of the handheld vacuum cleaner of FIG. 1.
Figure 4:
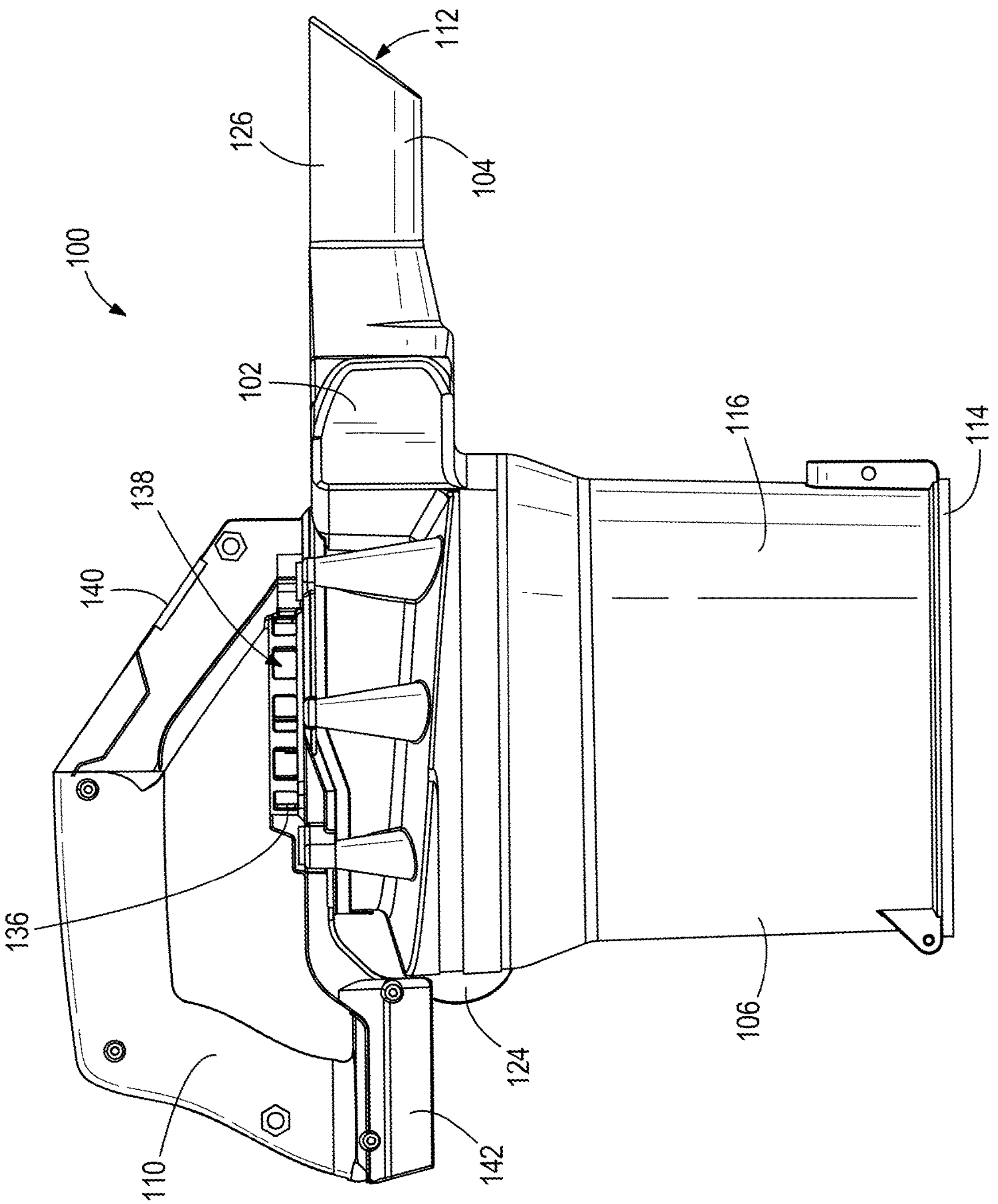
FIG. 4 is a right side elevation view of the handheld vacuum cleaner of FIG. 1.
Figure 5:
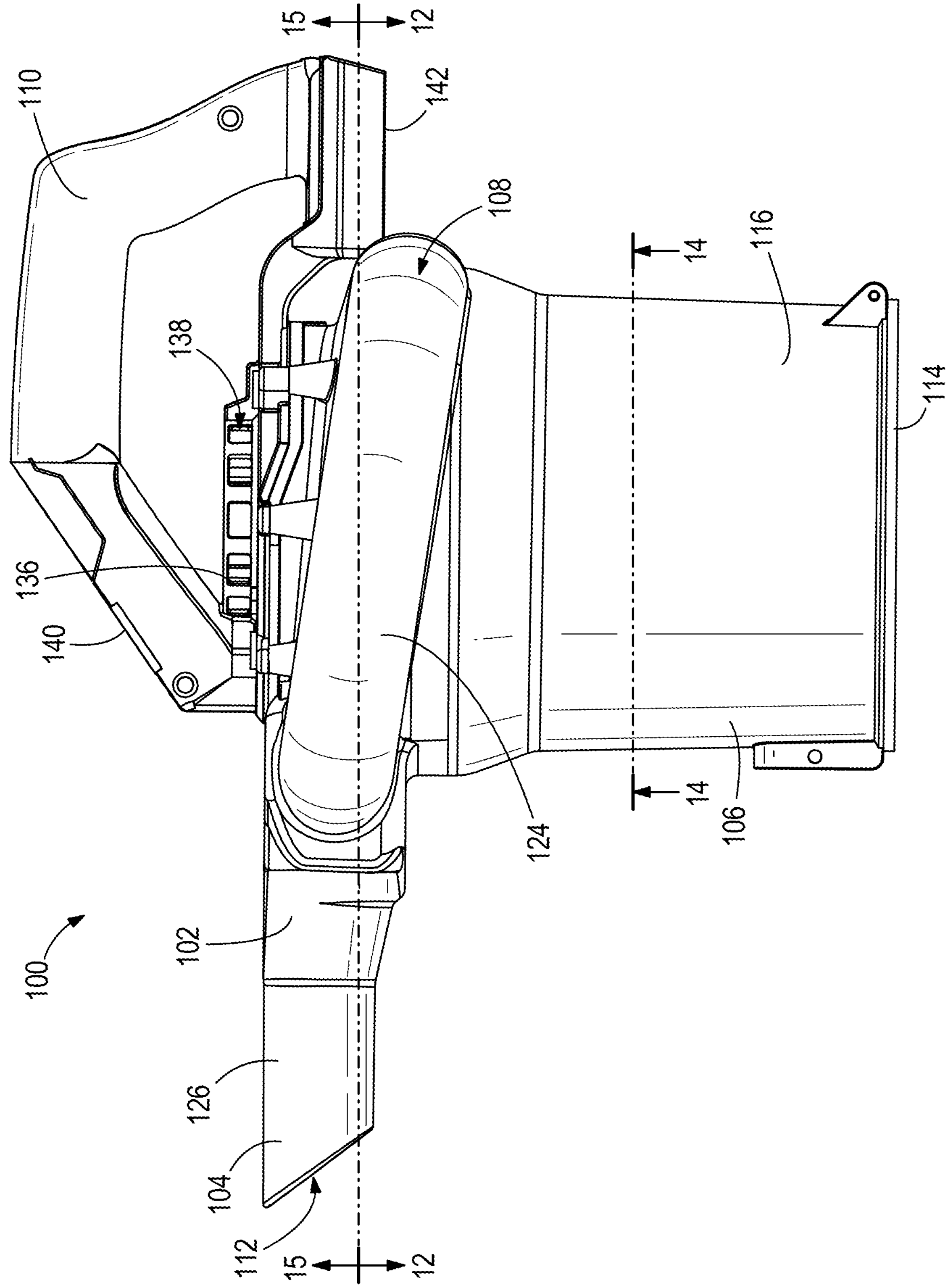
FIG. 5 is a left side elevation view of the handheld vacuum cleaner of FIG. 1.
Figure 7:
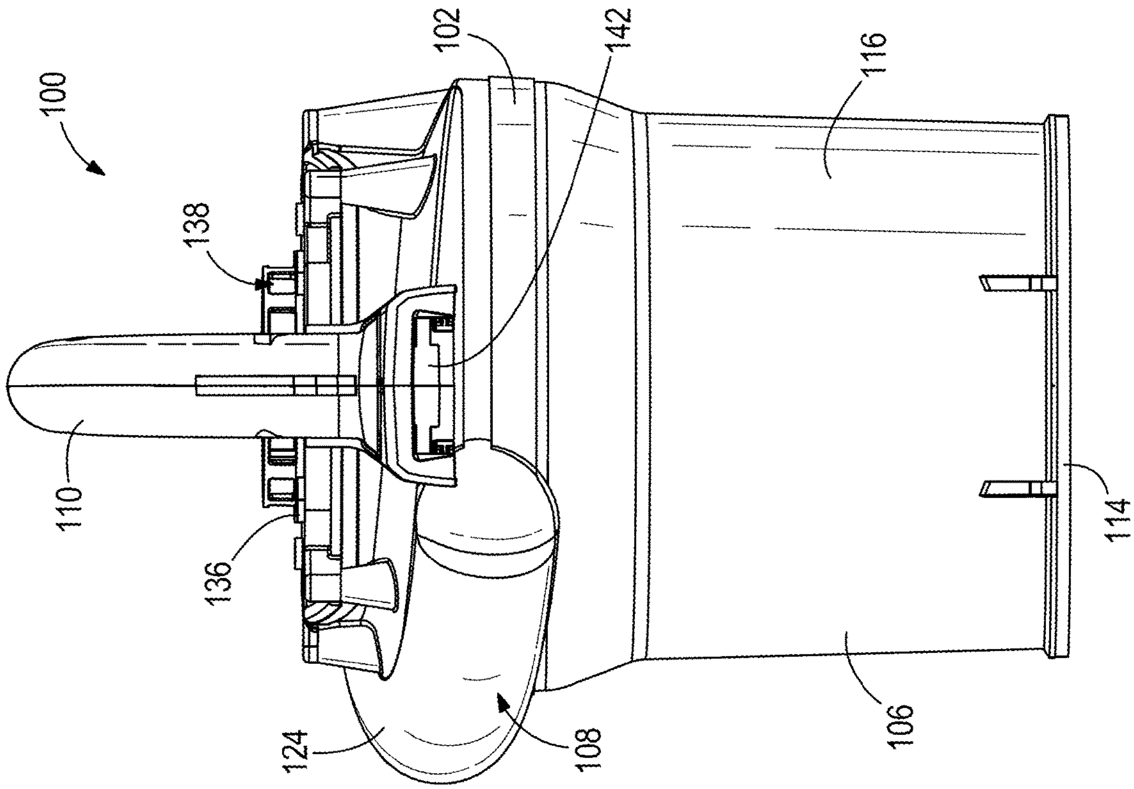
FIG. 7 is a rear elevation view of the handheld vacuum cleaner of FIG. 1.
Figure 6:
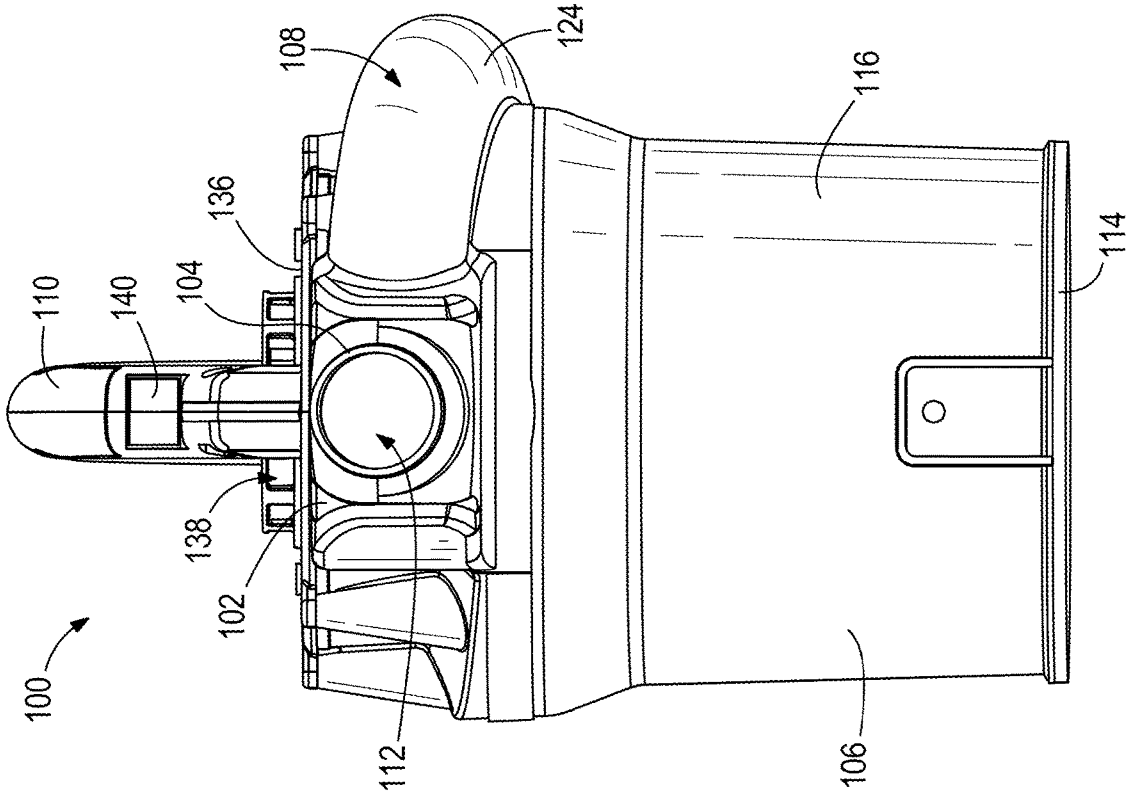
FIG. 6 is a front elevation view of the handheld vacuum cleaner of FIG. 1.
Figure 12:
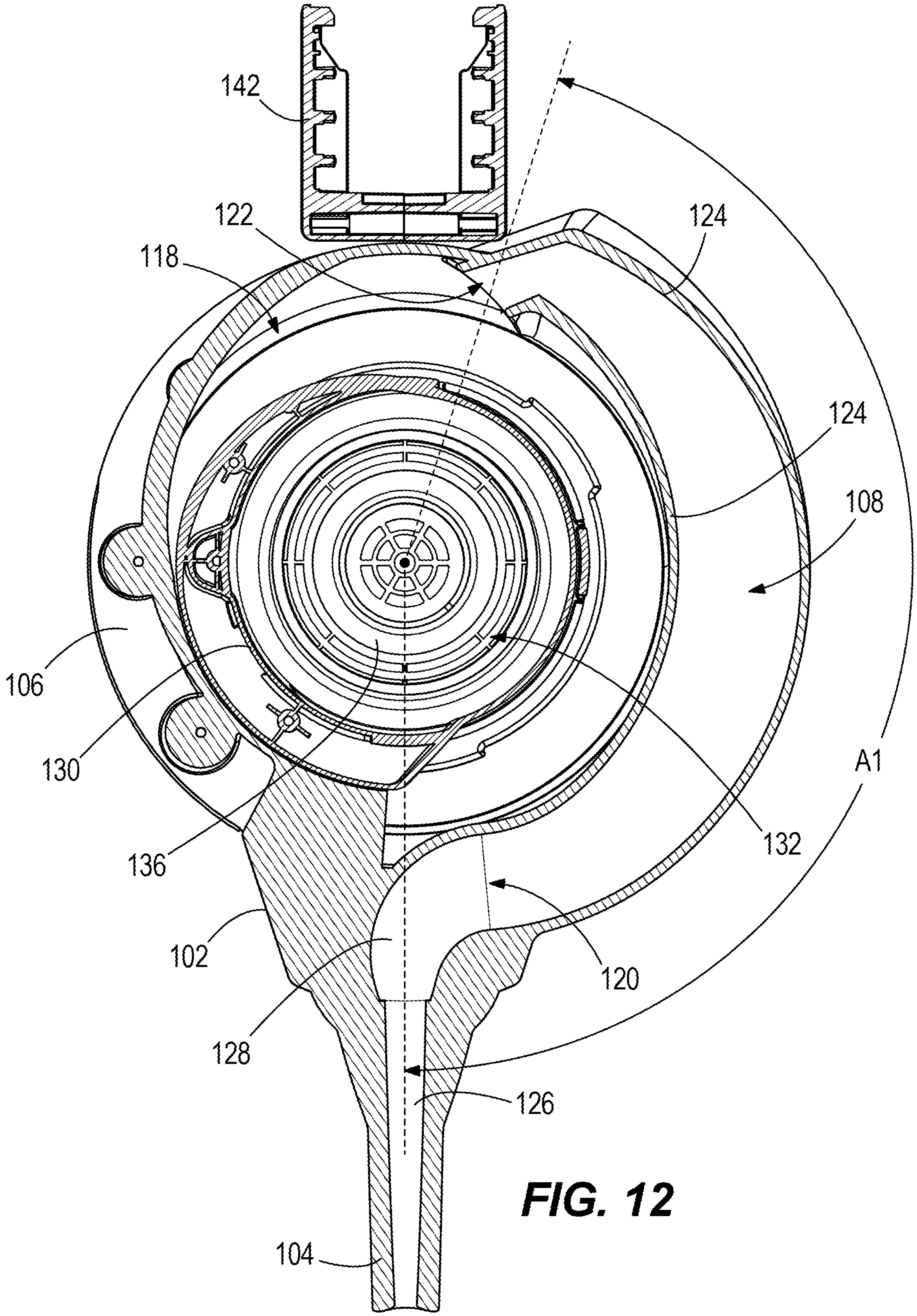
FIG. 12 is a cross-sectional top plan view of the handheld vacuum cleaner of FIG. 1.

As shown in FIG. 2, the passage 108, surrounded by the sidewall 124, is almost completely disposed on a single side of a plane passing through and bisecting both the handle 110 and the cyclone chamber 118. A benefit of this configuration is that the second end 122 of the passage 108 is disposed nearly centrally at the rear of the vacuum cleaner 100. As such, a user would have to excessively tilt the vacuum cleaner 100 rearwardly relative a normal operating position in order to allow liquid that is in the bottom of the cyclone chamber 118 to enter the second end 122 of the passage 108. Even if liquid enters the second end 122 of the passage 108, the user would then have to tilt the vacuum cleaner left and subsequently forward in order for any liquid that has entered the passage 108 to successfully escape via the suction opening 112. This pattern of orientations for the vacuum cleaner 100 is unconventional and would rarely occur. As such, the illustrated embodiment of a vacuum cleaner 100 is able to better contain liquid that has been picked up when compared to a non-circuitous pathway from the suction opening 112 to the cyclone chamber 118. Other embodiments, however, may include the passage 108 extending about a majority of the perimeter of the dirt cup wall 116 and/or extending about the cyclone chamber 118 more than once. With reference to FIG. 12, the passage 108 can also be said to extend circumferentially about a central cyclone axis of the cyclone chamber 118 through an angle A1. In some embodiments, this angle A1 is at least 90 degrees. In some embodiments, the angle A1 is between 90 degrees and 180 degrees. In some embodiments, the angle A1 is greater than 180 degrees, such as 270 degrees, 360 degrees, or even greater (to form a helix with multiple loops, for instance)

With reference to FIG. 1, in the illustrated embodiment, the passage 108 is disposed such that the sidewall 124 is visible from the outside of the vacuum cleaner 100 as an outward bulge relative to the dirt cup wall 116 and the lid section 136. Other embodiments, however, may include a passage 108 that is disposed in a different position such that the sidewall 124 is flush with the surrounding housing 102 and/or lid section 136. Still other embodiments may include a passage 108 having a different cross-sectional shape to minimize or eliminate the outward bulge of the sidewall 124.

Figure 16:
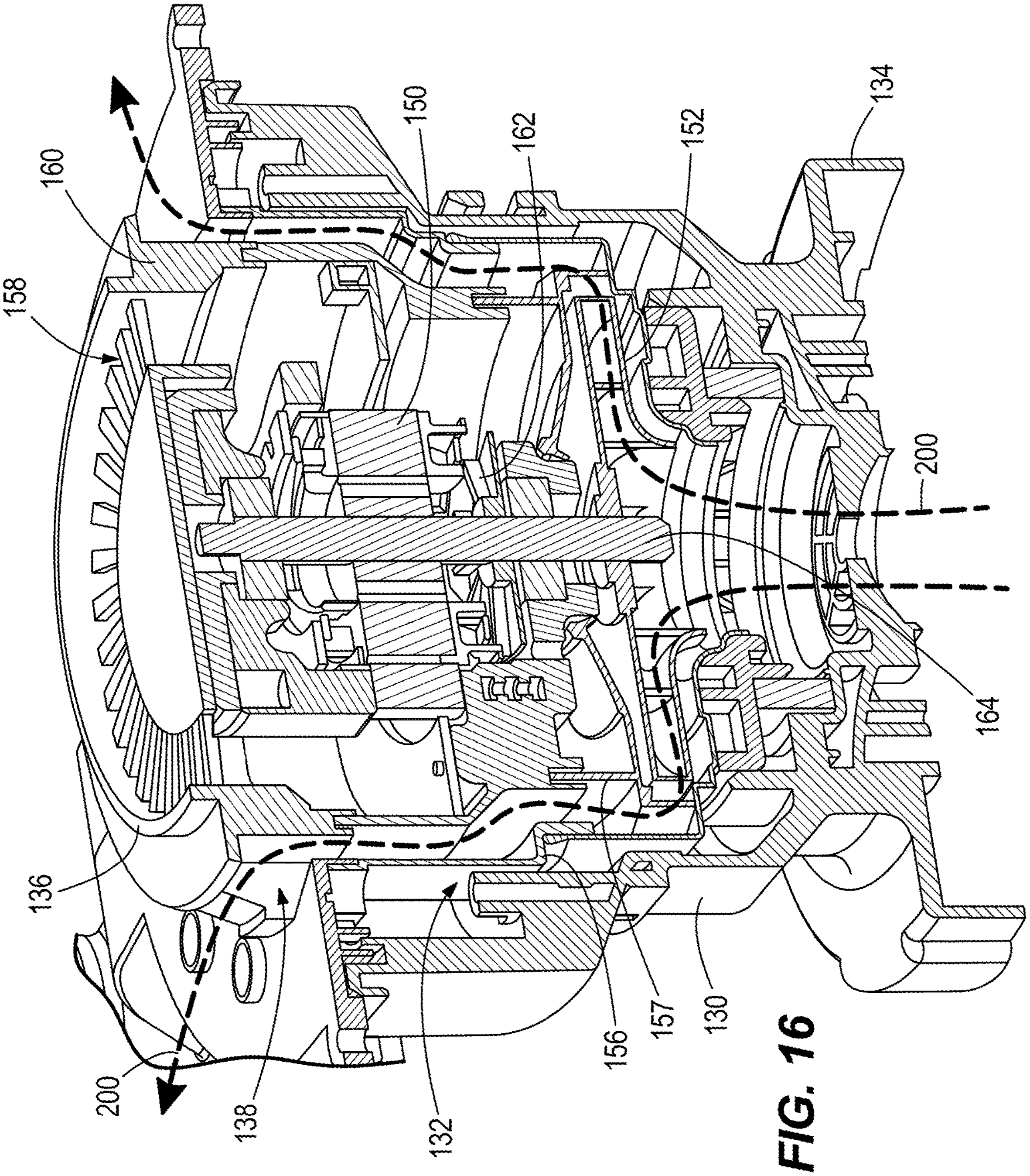
FIG. 16 is a cross-sectional perspective view of a motor and impeller in a cavity of a suction source housing of the handheld vacuum cleaner of FIG. 1.
Figure 17:
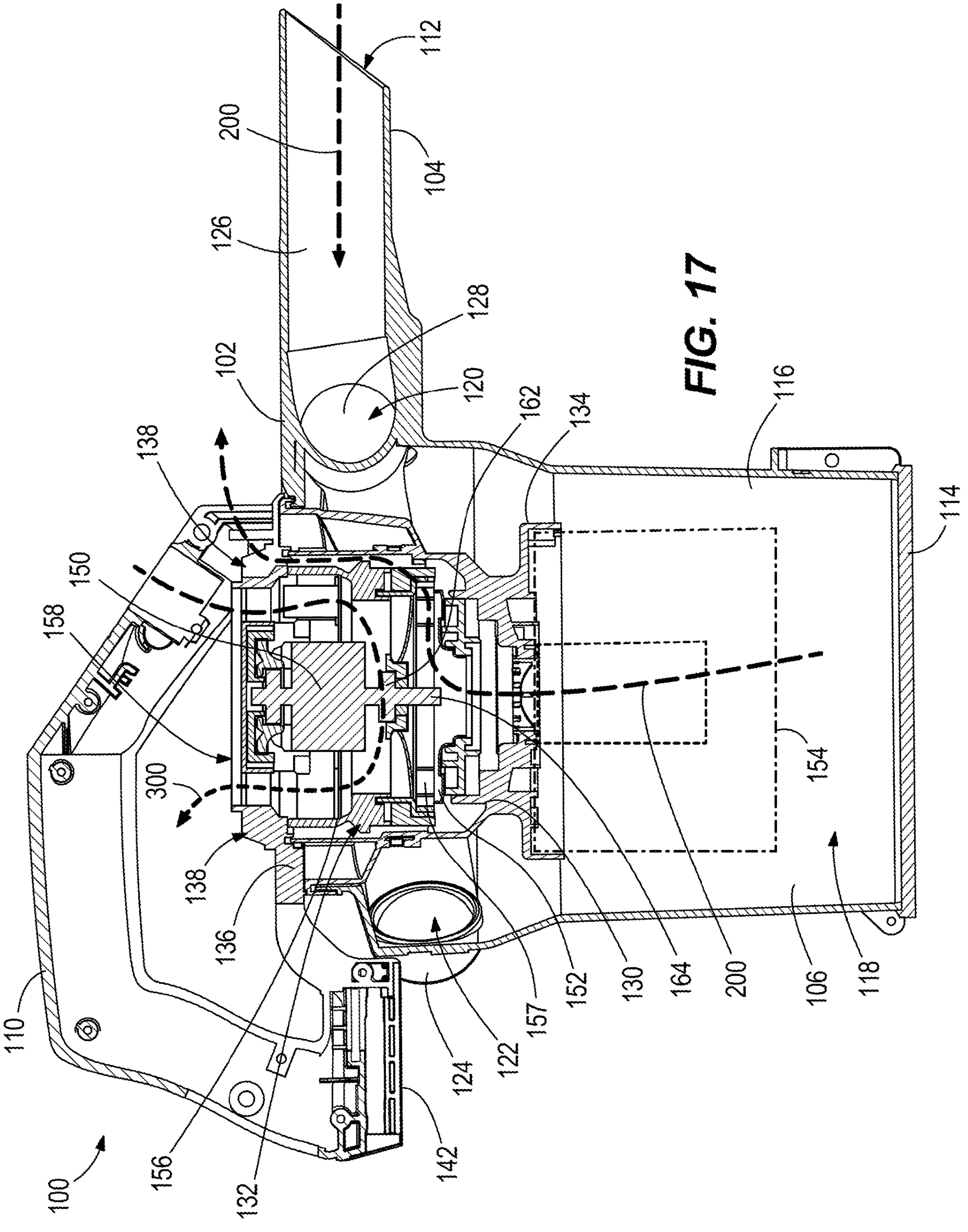
FIG. 17 is a cross-sectional side elevation view of the handheld vacuum cleaner of FIG. 1.
Figure 18:
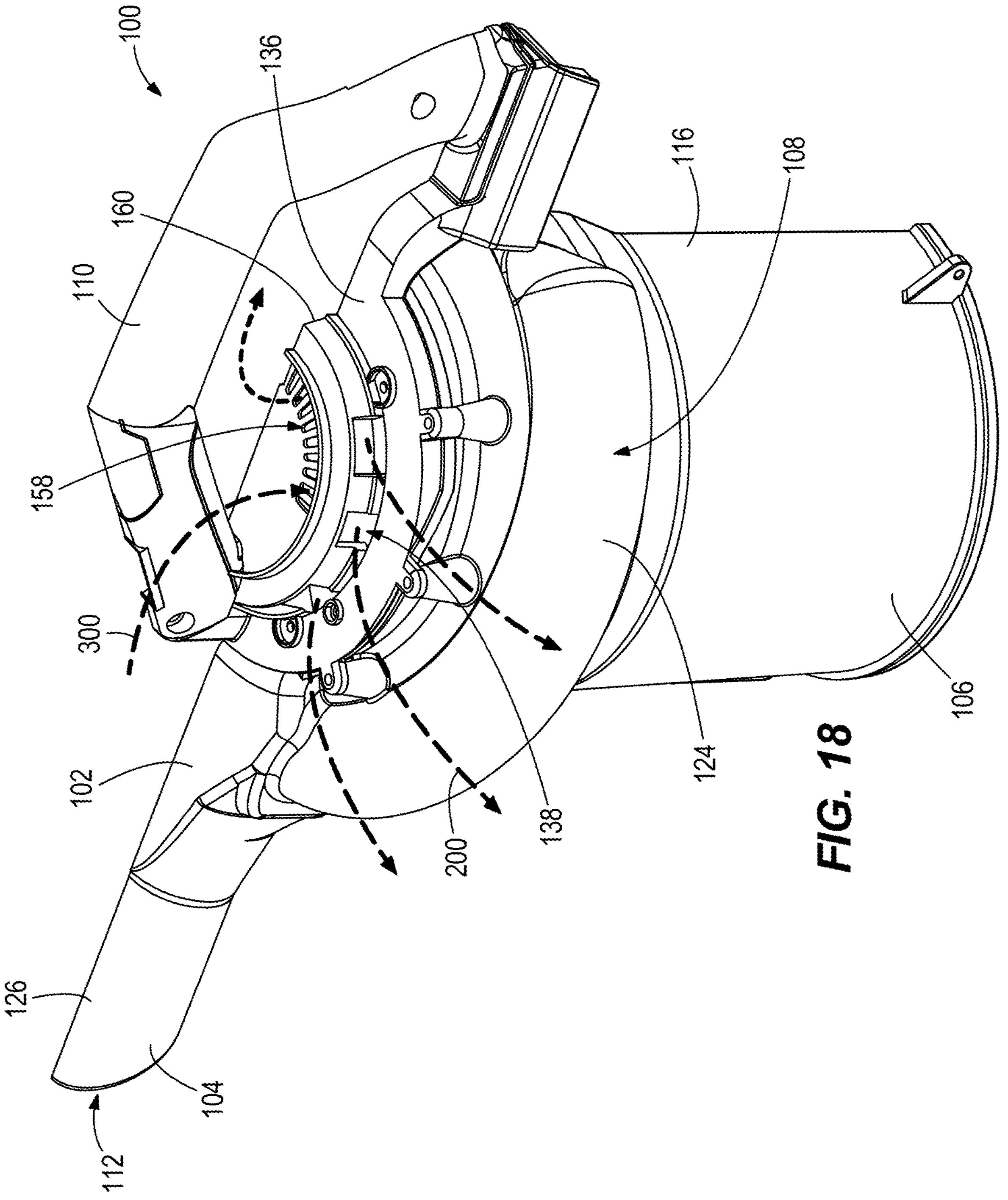
FIG. 18 is a top rear perspective view of the handheld vacuum cleaner of FIG. 1.

As shown in FIGS. 16-18, the motor 150 and impeller 152 are disposed in the cavity 132 of the suction source housing 130. The illustrated embodiment further includes a motor housing 156 disposed within the suction source housing 130. The motor 150 is disposed entirely in the motor housing 156 while the impeller 152 is disposed outside of the motor housing 156 but within the suction source housing 130. An end wall member 157 is coupled to the motor housing 156 between the motor 150 and the impeller 152 to separate the interior of the motor housing 156 from the rest of the cavity 132. The motor housing 156 and end wall member 157 cooperate to act as a barrier between the motor 150 and any liquid that may travel through the vacuum cleaner 100. As best shown in FIG. 16, the motor housing 156 includes, for instance, a lap or tongue and groove joint where the inner wall of the motor housing 156 meets the lid section 136 and where the inner wall of the motor housing 156 meets the end wall member 157. Some embodiments may further include a sealing material located at one or both of these joints. The arrangement shown in FIGS. 16-18 allows for a fluid flow 200 to travel into the suction opening 112, through the passage 108, into the cyclone chamber 118, through the filter 154, through the suction source housing 130 past the impeller 152, between inner and outer walls of the motor housing 156, and out the exhaust vents 138 in the lid section 136. This fluid flow 200 represents the operational airflow path through the vacuum cleaner 100 but also represents the flow path of any liquid that might enter and then subsequently escape the vacuum cleaner 100.

In the illustrated embodiment, the lid section 136 further includes motor vents 158 defined therein. The lid section 136 may further include a wall and roof structure 160 disposed between the exhaust vents 138 and the motor vents 158. This wall and roof structure 160 aids in preventing liquid from being introduced into the cavity 132 via the motor vents 158 and, more specifically, in the motor housing 156 even when the vacuum cleaner 100 is tilted and liquid escapes through the exhaust vents 138. The motor vents 158 allow for ventilation of the motor 150 in order to cool the motor. This cooling airflow 300 may be passive in and out of the motor housing 156 via the motor vents 158, or it may be forced airflow due to one or more fans. In the illustrated embodiment, the motor 150 includes a cooling fan 162 rotated by the driveshaft 164 of the motor 150 inside the motor housing 156. The cooling fan 162 is located on the driveshaft 164 between the motor 150 and the impeller 152.

Various features of the disclosure are set forth in the following claims.

What is claimed is:

1. A handheld vacuum cleaner comprising:
a housing having:
an inlet duct defining a suction opening, wherein the suction opening is a forward-facing suction opening for receiving debris drawn up from a surface being cleaned;
a dirt cup including a cyclone chamber defined therein;
an arcuate passage fluidly communicating the suction opening with the cyclone chamber, the arcuate passage being discrete from the cyclone chamber along a majority of a length of the arcuate passage, the arcuate passage being open to the cyclone chamber at an end of the arcuate passage, and
a sidewall separating an interior of the arcuate passage from the cyclone chamber between the suction opening and the end,
a handle coupled to the dirt cup, with a plane bisecting the handle and the cyclone chamber;
an inlet portion including the suction opening in fluid communication with the cyclone chamber;
a suction source housing disposed in the dirt cup,
a motor housing disposed in the suction source housing,
a motor disposed in the motor housing, wherein the motor housing at least partially separates the motor from fluid communication with the cyclone chamber,
an impeller rotatably driven by the motor,
an end wall member coupled to the motor housing, the end wall member positioned between the motor and the impeller, and
a lid coupling the handle to the dirt cup, the lid including at least one motor vent and at least one exhaust vent defined therein,
wherein the motor housing and the end wall member cooperate to seal space in the motor housing from direct fluid communication with the cyclone chamber;

wherein the suction opening, the inlet duct, the end, and the arcuate passage between the suction opening and the end are coplanar, wherein the end of the arcuate passage is a second end;

wherein the arcuate passage includes a first end, the first end of the arcuate passage being in fluid communication with the suction opening, wherein the second end is downstream from the first end, the second end being in fluid communication with the cyclone chamber, and wherein a majority of the arcuate passage is disposed on one side of the plane, wherein the at least one motor vent fluidly communicates space in the motor housing with ambient air, and wherein the at least one exhaust vent fluidly communicates the cyclone chamber with ambient air.

2. The handheld vacuum cleaner of claim 1, wherein the arcuate passage is formed as a single unitary part with the dirt cup.

3. The handheld vacuum cleaner of claim 1, wherein the arcuate passage is open to the cyclone chamber only at the end of the arcuate passage.

4. The handheld vacuum cleaner of claim 1, wherein the arcuate passage protrudes radially outwardly beyond a wall of the dirt cup.

5. The handheld vacuum cleaner of claim 4, wherein a majority of a width of the arcuate passage protrudes radially outwardly beyond the wall of the dirt cup.

6. The handheld vacuum cleaner of claim 1, wherein the dirt cup further includes a bottom door that is opposite the handle.

7. The handheld vacuum cleaner of claim 6, wherein the first end of the arcuate passage is farther than the second end of the arcuate passage from the bottom door of the dirt cup.

8. The handheld vacuum cleaner of claim 1, wherein the lid further includes a wall and roof structure disposed between the at least one motor vent and the at least one exhaust vent.

9. The handheld vacuum cleaner of claim 1, wherein at least a portion of the arcuate passage is disposed radially outwardly from at least a portion of the motor.

10. The handheld vacuum cleaner of claim 1, further comprising a battery connection rail coupled to the handle.

* * * * *